United States Patent [19]

La Fever

[11] 4,446,757
[45] May 8, 1984

[54] DIRECTIONAL GEAR RATIO TRANSMISSIONS

[75] Inventor: Alan E. La Fever, La Habra Heights, Calif.

[73] Assignee: The United States of America as represented by the Administrator of the National Aeronautics and Space Administration, Washington, D.C.

[21] Appl. No.: 387,728

[22] Filed: Jun. 11, 1982

[51] Int. Cl.$^3$ .................. F16H 57/10; F16H 3/44; F16H 5/52

[52] U.S. Cl. .................................. 74/758; 74/753; 74/812

[58] Field of Search ............... 74/810, 812, 750 R, 74/753, 789, 764, 758, 762, 770, 801, 765

[56] References Cited

U.S. PATENT DOCUMENTS

| | | | |
|---|---|---|---|
| 2,467,627 | 4/1949 | Olson | 74/812 X |
| 3,077,796 | 2/1963 | Johnson et al. | 74/810 |
| 3,307,426 | 3/1967 | Whitaker | 74/675 |
| 3,361,010 | 1/1968 | Miller | 74/810 |
| 3,521,505 | 7/1970 | Sebring | 74/785 |
| 4,137,798 | 2/1979 | Sisk et al. | 74/812 |

FOREIGN PATENT DOCUMENTS

| | | | |
|---|---|---|---|
| 114370 | 6/1945 | Sweden | 74/812 |
| 399391 | 10/1933 | United Kingdom | 74/812 |
| 500054 | 2/1939 | United Kingdom | 74/762 |
| 586724 | 3/1947 | United Kingdom | 74/367 |
| 879040 | 10/1961 | United Kingdom | |
| 242630 | 4/1969 | U.S.S.R. | 74/812 |

Primary Examiner—Lawrence J. Staab
Assistant Examiner—Bruce F. Wojciechowski
Attorney, Agent, or Firm—Howard J. Osborn; John R. Manning; Wallace J. Nelson

[57] ABSTRACT

A directional gear ratio transmission which transfers all clockwise inputs at a gear ratio different from all counter clockwise inputs. A transmission housing 10 encloses first and second epicyclic gear assemblies, 20 and 60, which are controlled by first and second undirectional clutches, 90 and 95, and has a first shaft 11 and a second shaft 12 extending therefrom. Within the first epicyclic gear assembly 20 is a first sun gear 21 connected to the first shaft 11. First planet gears, 24, 25 and 26, mesh with the first sun gear 21 and are held symmetrically about the first sun gear by a first planet gear carrier 36. A first ring gear 33 surrounds, and is also in mesh with the first planet gears 24, 25 and 26. Within the second epicyclic gear assembly 60 is a second sun gear 61 interconnected with the first planet gear carrier 36, by a connecting shaft 50. Second planet gears, 64, 65 and 66, mesh with the second sun gear 61 and are held symmetrically about the second sun gear by second planet gear carrier 76 which is connected to the first ring gear 33, by a connecting portion 51. Surrounding and in mesh with the second planet gears is a second ring gear 73 which is connected to the second shaft 12. First and second unidirectional clutches, 90 and 95, only allow rotation of the first planet gear carrier 36, and the first ring gear 33 in a common direction with respect to the transmission housing 10. This transmission inherently reverses all inputs to either the first or second shafts, and transmits all clockwise inputs to either shaft at a gear ratio different from all counterclockwise inputs.

15 Claims, 6 Drawing Figures

$$-\ -\ -\quad \frac{1}{(C_1+1)C_2} = GR_{FREE_{12}} = 1/GR_{FREE_{11}} \qquad === = C_2$$

$$-\ -\ -\quad \frac{C_2+1}{C_1 C_2} = GR_{ENGAGE_{12}} = 1/GR_{ENGAGE_{11}}$$

$$-\ -\ -\quad \frac{(C_1+1)(C_2+1)}{C_1} = GR_{FREE}/GR_{ENGAGE}$$

DIRECTIONAL GEAR RATIO TRANSMISSIONS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to gear transmissions using two epicyclic gear assemblies in combination with unidirectional clutches to transmit all clockwise inputs at a gear ratio different from that of counterclockwise inputs.

Epicyclic gear assemblies and unidirectional, sprag type clutches are both well known in the art of gear transmissions, and have been interconnected in various combinations to provide many different types of input-/output relationships. Those transmissions using two epicyclic gear assemblies in combination with unidirectional clutches can be categorized into two groups. One group uses a third input shaft that is interconnected with the epicyclic assemblies to control the transmission's overall gear ratio and output direction. The other group uses an independent means that engages non-directional clutches or discs within the transmission to change output direction and overall gear ratio. These transmissions transmit rotational inputs to an output shaft at a direction and overall gear ratio independent of the direction of the input rotation.

Accordingly, it is an object of this invention to provide a torque transfer mechanism wherein all clockwise inputs produce an output at a gear ratio different from that for counterclockwise inputs.

Another object is to transmit all inputs at selectable clockwise and counterclockwise gear ratios.

A further object of the invention is to transmit inputs at selected gear ratios dependent only upon direction of the input.

A still further object of the invention is to provide an output torque with direction opposite to that of the input.

An additional object of the invention is to transmit torques at selected forward and reverse gear ratios using two epicyclic gear assemblies having interchangeable elements.

SUMMARY OF THE INVENTION

The foregoing and other objects of the invention are achieved by interconnecting two epicyclic gear assemblies in combination with unidirectional clutches. A first shaft is connected to the sun gear of a first epicyclic gear assembly. First planet gear assemblies mesh with the first sun gear and first ring gear. A first planet gear carrier holds the first planet gear assemblies symmetrically about the first sun gear, and transmits its rotational displacements to the second epicyclic gear assembly's sun gear by a connecting shaft. A connecting portion transmits rotational displacement of the first ring gear to a second planet gear carrier. Second planet gear assemblies mesh with the second sun gear and a second ring gear, and are held symmetrically about the second sun gear by the second planet gear carrier. A second shaft extends from the second ring gear. First and second unidirectional clutches are each secured to a stationary transmission housing, and restrict the independent rotation of the first planet gear carrier and first ring gear to a common direction. Interconnecting first and second epicyclic gear assemblies in combination with unidirectional clutches, as described above, results in a transmission that inherently transmits all rotational inputs in that direction for which the clutches engage at a lower gear ratio than do those rotational inputs in that direction for which the unidirectional clutches are disengaged.

DETAILED DESCRIPTION OF THE INVENTION

Figure 1:
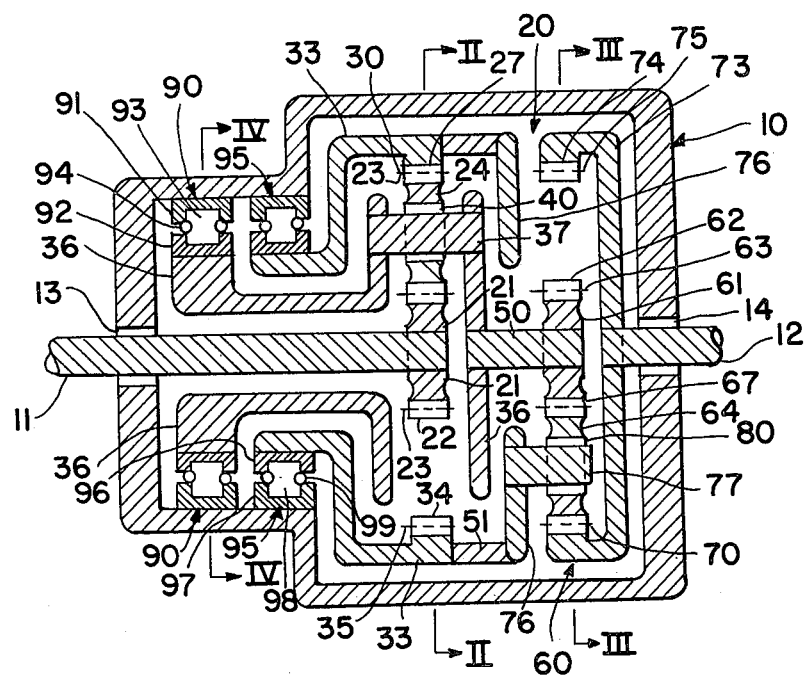
FIG. 1 is a sectional view of a directional gear ration transmission.

FIG. 1 is a sectional view of a directional gear ratio transmission, and particularly illustrates how first and second epicyclic gear assemblies, generally designated 20 and 60, are interconnected within a transmission housing 10. Both epicyclic gear assemblies consist of a ring gear, sun gear, planet carrier, and planet gears. Extending from within the transmission housing are first and second shafts, 11 and 12, supported by first and second shaft bearings, 13 and 14. The shaft bearings are attached to the transmission housing, and allow each shaft to rotate freely in either a clockwise or a counterclockwise direction while the transmission housing is held stationary.

Figure 2:
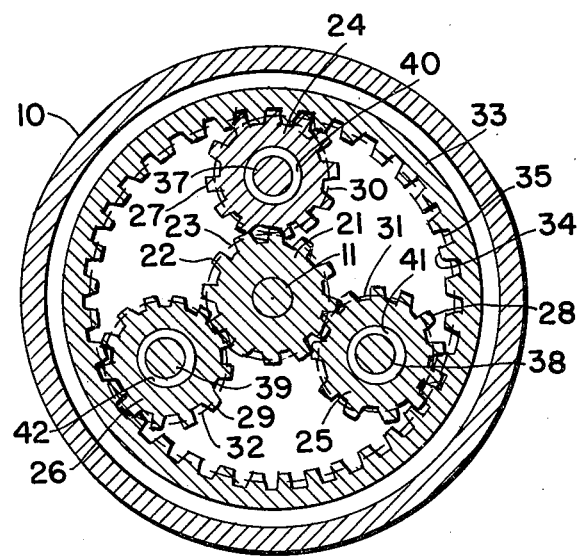
FIG. 2 is a cross-sectional view of FIG. 1, at line II—II showing the first epicyclic gear assembly in greater detail.

The first shaft 11 is connected to a first sun gear 21 that has teeth 22 which mesh with teeth, 27, 28 and 29, on first planet gears, 24, 25 and 26, respectively. FIG. 2, a view along line II—II in FIG. 1, shows first planet gear bearings. 40, 41 and 42, that allow the first planet gears 24, 25 and 26, to rotate freely about first pins, 37, 38 and 39. The first pins, 37, 38 and 39 extend from a first planet gear carrier 36 to hold the first planet gears, 24, 25 and 26, symmetrically about the first sun gear 21, and first planet gear pitch lines, 30, 31 and 32, tangent to the first sun gear pitch line 23. A first ring gear 33, also has teeth 34 in mesh with the first planet gears, and the first ring gear pitch line 35, tangent to the first planet gear pitch lines, 30, 31 and 32.

In the preferred embodiment, the first planet gear carrier 36 is connected to a first unidirectional clutch 90 that allows the first planet gear carrier 36 to rotate only in a counterclockwise direction with respect to the transmission housing 10. A second unidirectional clutch, 95, connected to the first ring gear 33, allows only a counterclockwise rotation of the first ring gear 33. The first planet gear carrier 36, is then held stationary by the first unidirectional clutch 90 while the first sun gear 21, is rotated clockwise; thus, clockwise first sun gear rotation induces the first planet gears 24, 25 and 26, to rotate counterclockwise with respect to the first planet gear carrier 36, and the first ring gear 33, rotate counterclockwise. Counterclockwise rotation of the first sun gear 21 induces the first planet gears, 24, 25 and 26, to rotate clockwise with respect to the first planet gear carrier 36, and while the first ring gear 33 is held stationary by the second unidirectional clutch 95, the first planet gear carrier 36, rotates counterclockwise. The gear ratios at which rotational inputs are transferred are discussed in the Operation of the Invention.

Figure 3:
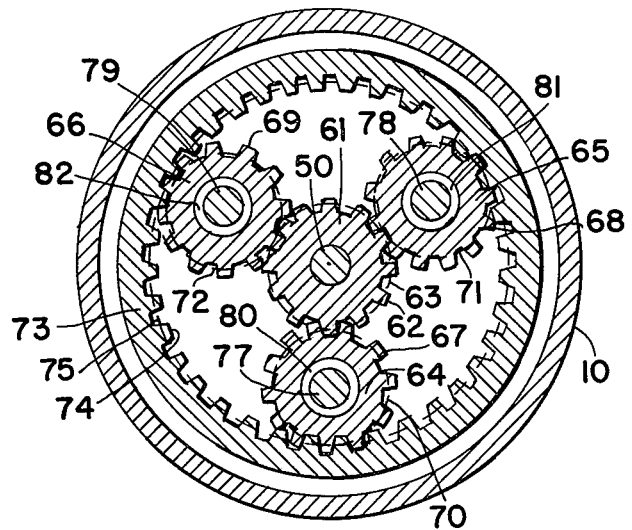
FIG. 3 is a cross-sectional view of FIG. 1, at line III—III showing the second epicyclic gear assembly in greater detail.

FIGS. 1 and 3 illustrate a second epicyclic gear assembly 60 which is similar to the first epicyclic gear assembly 20. A second sun gear 61 has teeth 62 which mesh with teeth, 67 68 and 69, on second planet gears, 64, 65 and 66. Second planet gear bearings, 80, 81 and 82, allow free rotation of the second planet gears, 64, 65 and 66, about second pins, 77, 78 and 79, which extend from a second planet gear carrier 76. The second planet gear carrier 76, extends from, and may either be attached to or part of the connecting portion 51 and first ring gear 33. Second pins hold the second planet gears symmetrically about the second sun gear, and second gear pitch lines, 70, 71 and 72, tangent to the second sun gear pitch line 63. The second shaft 12 is connected to a second ring gear 73, which also has teeth 74 in mesh with the second planet gear teeth, and a second ring gear pitch line 75 tangent to the second planet gear pitch lines, 70, 71 and 72.

FIG. 1 shows how the second epicyclic gear assembly 60 is connected to the first epicyclic gear assembly 20, by a connecting shaft 50 and a connecting portion 51 which are both co-linear with the first and second shafts, 11 and 12. The connecting portion 51 extends from, and may either be attached to or part of the first ring gear 33; its function is to rotate the second planet gear carrier 76 at the same speed and direction as the first ring gear 33. The connecting shaft 50 extends from the first planet gear carrier 36, to the second sun gear 61, and rotates the second sun gear 61, at the same speed and direction as the first planet gear carrier 36.

In the preferred embodiment, the connecting shaft 50 holds the second sun gear 61 stationary while the connecting portion 51 rotates the second planet gear carrier 76 counterclockwise when the first shaft 11, is rotated clockwise. These inputs to the second epicyclic gear assembly 60 induce counterclockwise rotation of the second planet gears, 64 65 and 66, with respect to the second planet gear carrier 76, and rotate the second ring gear 73 and attached second shaft 12 counterclockwise. When the first shaft 11, is rotated counterclockwise, the connecting shaft 50 rotates the second sun gear 61, counterclockwise while the connecting portion 51 holds the second planet gear carrier 76 stationary. These inputs induce the second planet gears 64, 65 and 66, to rotate clockwise with respect to the second planet gear carrier 76, and the second ring gear 73 and second shaft 12 to rotate clockwise. Other permutations, including inputs to the second shaft 12, are more fully described in the Operation of the Invention.

First and second unidirectional clutches, generally disignated 90 and 95 in FIG. 1, restrict the rotation direction of the first planet gear carrier, 36 second sun gear 61, first ring gear 33, and second planet gear carrier 76 to a common direction with respect to the transmission housing 10.

Figure 4:
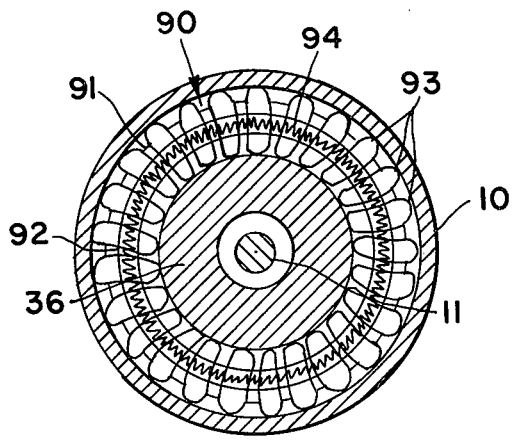
FIG. 4 is a cross-sectional view of FIG. 1, at line IV—IV showing the first unidirectional clutch in greater detail.

In the preferred embodiment, the first unidirectional clutch 90 allows the first planet gear carrier 36, and the second sun gear 61 to only rotate counterclockwise. Within the first unidirectional clutch shown in FIG. 4, are an outer race 91, attached to the transmission housing 10; an inner race 92, attached to the first planet gear carrier 36; sprags 93, located between the inner and outer races; and sprag springs 94 which pass through the sprags to prevent the sprags from jamming when the inner race 92 is rotated counterclockwise relative to the outer race 91. Rotating the inner race clockwise causes the sprags 93 to rotate counterclockwise and jam any relative motion between the inner and outer races; counterclockwise rotation of the inner race is not obstructed by the sprags. The second unidirectional clutch 95 prevents clockwise rotation of the first ring gear 33 and second planet gear carrier 76 with respect to the transmission housing 10, and is similar in structure to the first unidirectional clutch 90. The unidirectional clutches, 90 and 95, may also be of any other type that restrict all rotation in one direction, and allow free rotation in the other; such types include: ratchet and pawl, friction, and locking roller units.

The directional gear ratio transmission's specific gear ratio for each input direction is further determined by the number of teeth on the first and second sun gears, $S_1$ and $S_2$, relative to the number of teeth on the first and second ring gears, $R_1$ and $R_2$. A special case results when $S_1 = S_2$ and $R_1 = R_2$ because the various types of gears within the first epicyclic gear assembly become similar to those in the second epicyclic gear assembly, and are therefore interchangeable.

Figure 5:
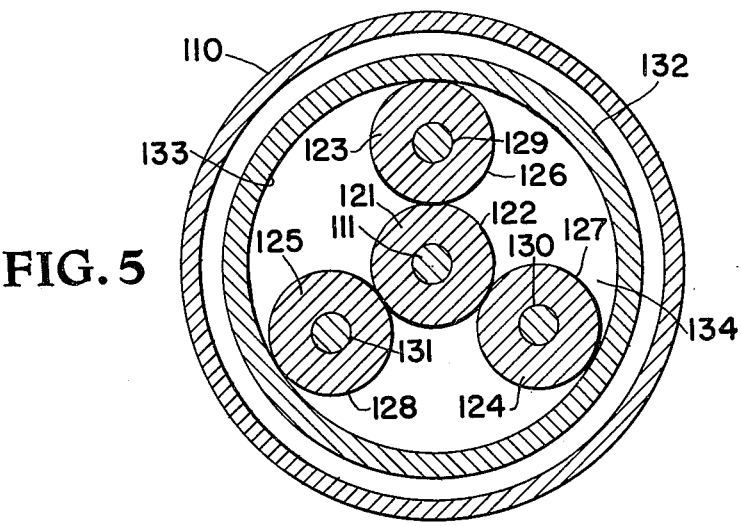
FIG. 5 is a cross-sectional view of a directional gear ratio transmission showing a modified projection of a first epicyclic wheel assembly.

FIG. 5 illustrates how the gears in FIG. 1 may be replaced with friction wheels. A first shaft 111 passes through the stationary transmission housing 110, and is attached to a first sun wheel 121. The first sun wheel 121 has a friction surface 122 located where the first sun gear pitch line 23 is in FIG. 1. The first planet wheel friction surfaces in FIG. 5, 126, 127 and 128, are also located in a similar position as the first planet gear pitch lines, 30, 31 and 32, shown in FIG. 1, and are tangent to the first sun wheel friction surface 122. First pins, 129, 130 and 113, hold the first planet wheels symmetrically about the first sun wheel, and tangent to the first ring wheel friction surface 133. Power and rotational displacements are then transmitted from the first shaft 111 to the first planet wheel carrier 134 and ring wheel 132 via the described friction surfaces in a similar manner as the gears transmit power along their respective pitch lines in FIG. 1.

Other variations to the described structure while maintaining the disclosed function and result include the use of compound gear assemblies in lieu of the described planet gears; each compound gear assembly would have a first pinion in mesh with a sun gear and a second pinion attached to the first pinion, in mesh with a ring gear which may be of either an internal or external type.

OPERATION OF THE INVENTION

The structure described in FIGS. 1–4 results in a transmission that transmits all rotational inputs in the direction which the unidirectional clutches engage at a lower gear ratio than inputs in the direction which the unidirectional clutches are free. The direction which the first and second unidirectional clutches, 90 and 95, engage merely determines the direction of input that will be transmitted at the higher or lower gear ratio, and does not materially effect the invention's operation.

Epicyclic gear assemblies have three input/output points at which rotations may be transmitted: sun gears, ring gears, and planet gear assemblies by holding one input point stationary:

$$P/S|_R = \frac{R+S}{S} = C + 1$$

$$R/S|_P = R/S = C$$

$$P/R|_S = \frac{R+S}{R} = \frac{C+1}{C}$$

where:
- R = number of teeth in ring gear
- S = number of teeth in sun gear
- P = planet gear carrier
- C = R/S Subsequent descriptions of rotation within the preferred embodiment are as viewed from left to right in FIG. 1. Rotating the first shaft 11 and sun gear 21 clockwise induces a counterclockwise rotation on the first planet gears, 24, 25 and 26, with respect to the first planet gear carrier 36, and a counterclockwise rotation of the first ring gear 33. The forces resulting from clockwise first sun gear rotation tend to rotate the first planet gear carrier 36 clockwise, but the first unidirectional clutch 90 allows only counterclockwise rotation; thus the first planet gear carrier 36 is held stationary. The connecting shaft 50 holds the second sun gear 61 stationary while the connecting portion 51 rotates the second planet gear carrier 76, counterclockwise. These inputs to the second epicyclic gear assembly 60 induce a counterclockwise rotation on the second planet gears, 64, 65 and 66, with respect to the second planet gear carrier 76, and rotate the second ring gear and shaft, 73 and 12, counterclockwise. The stepdown gear ratio for inputs to the first shaft 11 in the direction at which the first clutch 90 engages is equal to:

$$GR_{engage11} = (R_1/S_1|P_1)(R_2/P_2|S_2) =$$

$$-(R_1/S_1)\left(\frac{R_2}{R_2+S_2}\right) = -\frac{C_1 C_2}{C_2 + 1}$$

Counterclockwise rotation of the first shaft 11, and first sun gear 21 induce clockwise rotation on the first planet gears, 24, 25 and 26, with respect to the first planet gear carrier 36 which is then rotated counterclockwise. The first planet gears, 24, 25 and 26, tend to rotate the first ring gear 33 clockwise, but the second unidirectional clutch allows only counterclockwise rotation; thus the first ring gear 33 is held stationary. The connecting portion 51 holds the second planet gear carrier 76 stationary while connecting shaft 50 rotates the second sun gear 61 counterclockwise. The second planet gears, 64, 65 and 66, rotate clockwise with respect to the second planet gear carrier 76, as does the second ring gear 73 and attached second shaft 12. The stepdown gear ratio for inputs to the first shaft 11 in the direction at which the first clutch is free is:

$$GR_{free11} = (P_1/S_1|R_1)(R_2/S_2|P_2) =$$

$$-\left(\frac{R_1+S_1}{S_1}\right)(R_2/S_2) = -C_2(C_1+1)$$

Looking at the ratio of $GR_{engage11}/GR_{free11}$ we see:

$$GR_{engage11}/GR_{free11} = \left(\frac{C_1 C_2}{C_2 + 1}\right)\left(\frac{1}{C_2(C_1+1)}\right) =$$

$$\frac{C_1}{(C_1+1)(C_2+1)} = \frac{1}{(1+1/C_1)(C_2+1)} < 1$$

Thus, rotational inputs to the first shaft 11 in a direction which the unidirectional clutches, 90 and 95, engage will be transmitted at a lower gear ratio and higher speed than all inputs to the first shaft in the direction which the unidirectional clutches are free.

Input may also be transmitted from the second shaft 12, in lieu of the first shaft 11, without effecting the internal relative rotations as described above. However, the transmission's gear ratios are the inverse of those described above. The directional gear ratio transmission's overall gear ratios for inputs to the second shaft 12 are disclosed below:

$$GR_{engage12} = (S_2/R_2|P_2)(S_1/P_1|R_1) =$$

$$-(S_2/R_2)\left(\frac{S_1}{R_1+S_1}\right) = -\frac{1}{C_2(C_1+1)}$$

$$GR_{free12} = (P_2/R_2|S_2)(S_1/R_1|P_1) =$$

$$-\left(\frac{S_2+R_2}{R_2}\right)(S_1/R_1) = -\frac{C_2+1}{C_1 C_2}$$

where again:

$$GR_{engage12}/GR_{free12} = \left(\frac{1}{C_2(C_1+1)}\right)\left(\frac{C_2 C_1}{C_2+1}\right) =$$

$$\frac{C_1}{(C_1+1)(C_2+1)} = \frac{1}{(1+1/C_1)(C_2+1)} < 1$$

Similar gear ratios result from the use of wheels, in lieu of gears, within the first and second epicyclic gear assemblies where R is equal to the pitchline diameter of the ring gear and S is the pitchline diameter of the sun gear.

Figure 6:
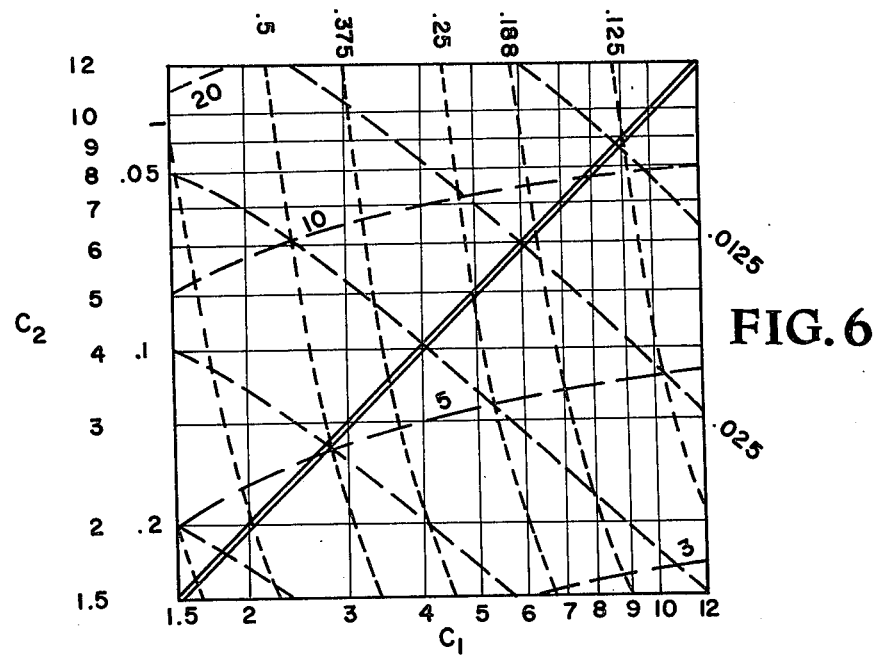
FIG. 6 shows the overall gear ratio for directional gear ratio transmissions illustrated in FIGS. 1-4.

FIG. 6 illustrates how sun and ring gear sizes may be varied within the first and second epicyclic gear assemblies to change the specific gear ratios at which input to the first shaft 11 is transmitted. Gear ratios for inputs to the second shaft 12 are the inverse of those found from FIG. 6. The transmission's overall gear ratio, and others identified in the figure's legend, are found by interpolating values from that point corresponding to $C_1 = R_1/S_1$ and $C_2 = R_2/S_2$.

Although the invention has been described relative to a particular embodiment thereof, there are obviously numerous variations and modifications readily apparent to those skilled in the art in the light of the above teachings. It is therefore to be understood that the invention may be practiced other than as specifically claimed.

What is claimed as new and desired to be secured by Letters Patent of the United States is:

1. A directional gear ratio transmission comprising:
   transmission housing means;
   first shaft means;
   second shaft means;
   first epicyclic assembly means for receiving input from said first shaft means in a first or a second direction with respect to said transmission housing means;
   first and second output means, within said first epicyclic assembly means, for transmitting output from said first epicyclic assembly means;
   first means for restricting transmission of said output from said first output means in said first direction;
   second means for restricting transmission of said output from said second output means in said first direction;
   second epicyclic assembly means for transmitting output to said second shaft means in said first or said second direction;
   first and second input means, within said second epicyclic assembly means, for receiving said output from said first and said second output means;
   first connecting means for transmitting said output from said first output means to said first input means;
   second connecting means for transmitting said output from said second output means to said second input means;
   said input from said first shaft means is transmitted by said directional gear ratio transmission to said second shaft means at a higher speed and lower gear ratio when said input is in said first direction than in said second direction.

2. A device as in claim 1 wherein:
   input to said directional gear ratio transmission is applied to said second shaft, in lieu of said first shaft; and
   said input to said second shaft is transmitted by said first shaft at a higher speed and lower gear ratio in said first direction than in said second direction.

3. A device as in claim 1 wherein:
   said first output means is a first planet carrier means; and
   said second output means is a first ring gear means.

4. A device as in claim 1 wherein:
   said first input means is a second sun gear means; and
   said second input means is a second planet carrier means.

5. A device as in claim 1 wherein:
   said first means for restricting transmission of said output is a first unidirectional clutch; and
   said second means for restricting transmission of said output is a second unidirectional clutch.

6. A device as in claim 1 wherein:
   said transmission housing means, first and second epicyclic assembly means, first and second unidirectional clutches, and first and second shaft means are symmetric about a common axis.

7. A device as in claim 1 wherein:
   said first and second epicyclic assembly means are gear assemblies.

8. A device as in claim 1 wherein:
   said first epicyclic assembly means includes a first sun means, first ring means, first planet carrier means, and first planet means; and
   said second epicyclic assembly means includes a second sun means, second ring means, second planet carrier means, and second planet means.

9. A device as in claim 8 wherein:
   said first ring means is located at a distance equal to the diameter of said first planet means away from said first sun means; and
   said second ring means is located at a distance equal to the diameter of said second planet means away from said second sun means.

10. A device as in claim 5 wherein:
    said first and second unidirectional clutch means includes an inner race means, outer race means attached to said transmission housing means, sprag means located between said inner and outer race means for jamming said inner race means when rotated in an engaging direction, and sprag spring means for holding said sprag means in positions that allow said inner race means to be rotated freely in said second direction;
    said inner race means of said first unidirectional clutch means is attached to said first output means; and
    said inner race means of said second unidirectional clutch means is attached to said second output means.

11. A device as in claim 8 wherein:
    said first and second sun means are similar;
    said first and second ring means are similar; and
    said first and second planet means are similar, whereby elements of the first epicyclic assembly means are interchangeable with corresponding elements of the second epicyclic assembly means.

12. A device as in claim 8 wherein:
    said first planet means includes first pinions in contact with said first sun means and second pinions in contact with said first ring means; and
    said second planet means includes first pinions in contact with said second sun means, and second pinions in contact with said second ring means.

13. A device as in claim 8 or claim 12 wherein said first ring means is an internal ring wheel means; and
    said second ring means is an internal ring wheel means.

14. A transmission device as in claim 8 or claim 12 wherein said first and second ring means are external ring wheel means.

15. A transmission device as in claim 8 wherein said first sun means, first ring means, and first planet means are ring wheel means, and said second sun means, second ring means and second planet means are ring wheel means.

* * * * *

UNITED STATES PATENT AND TRADEMARK OFFICE
CERTIFICATE OF CORRECTION

PATENT NO. : 4,446,757

DATED : May 8, 1984

INVENTOR(S) : Alan E. Le Fever

It is certified that error appears in the above-identified patent and that said Letters Patent is hereby corrected as shown below:

On the title page, inventor's name should read

-- Alan E. Le Fever --.

*Signed and Sealed this*

*Twenty-sixth* Day of *February 1985*

[SEAL]

*Attest:*

DONALD J. QUIGG

*Attesting Officer*    *Acting Commissioner of Patents and Trademarks*